June 8, 1965  B. I. ULINSKI  3,187,829
BRAKE AND HANDLE CONTROL FOR INDUSTRIAL TRUCK
Filed Jan. 29, 1963  4 Sheets-Sheet 1

INVENTOR.
B. I. ULINSKI
BY
ATTORNEY

June 8, 1965

B. I. ULINSKI 3,187,829

BRAKE AND HANDLE CONTROL FOR INDUSTRIAL TRUCK

Filed Jan. 29, 1963

INVENTOR.
B. I. ULINSKI
BY
ATTORNEY

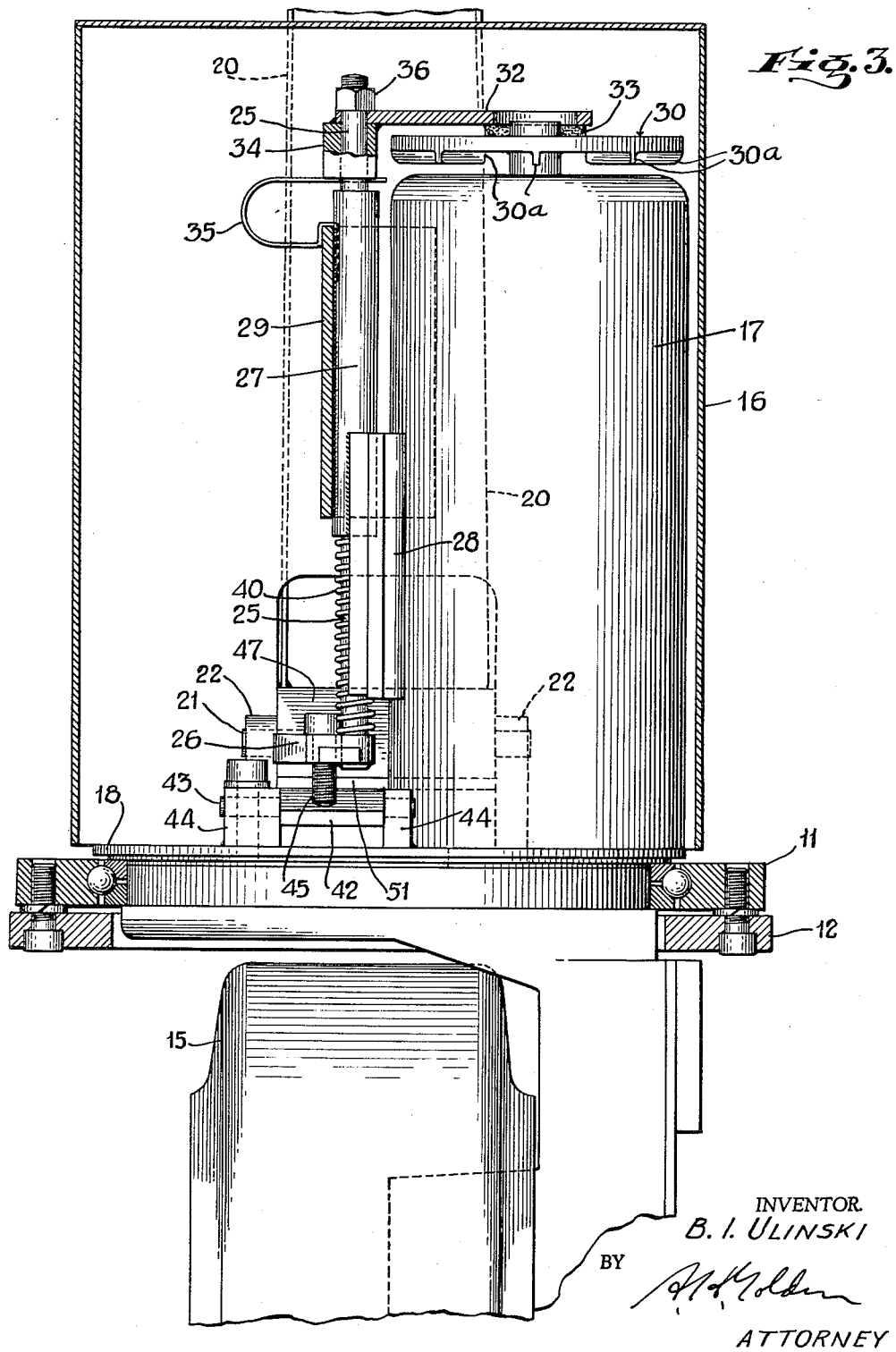

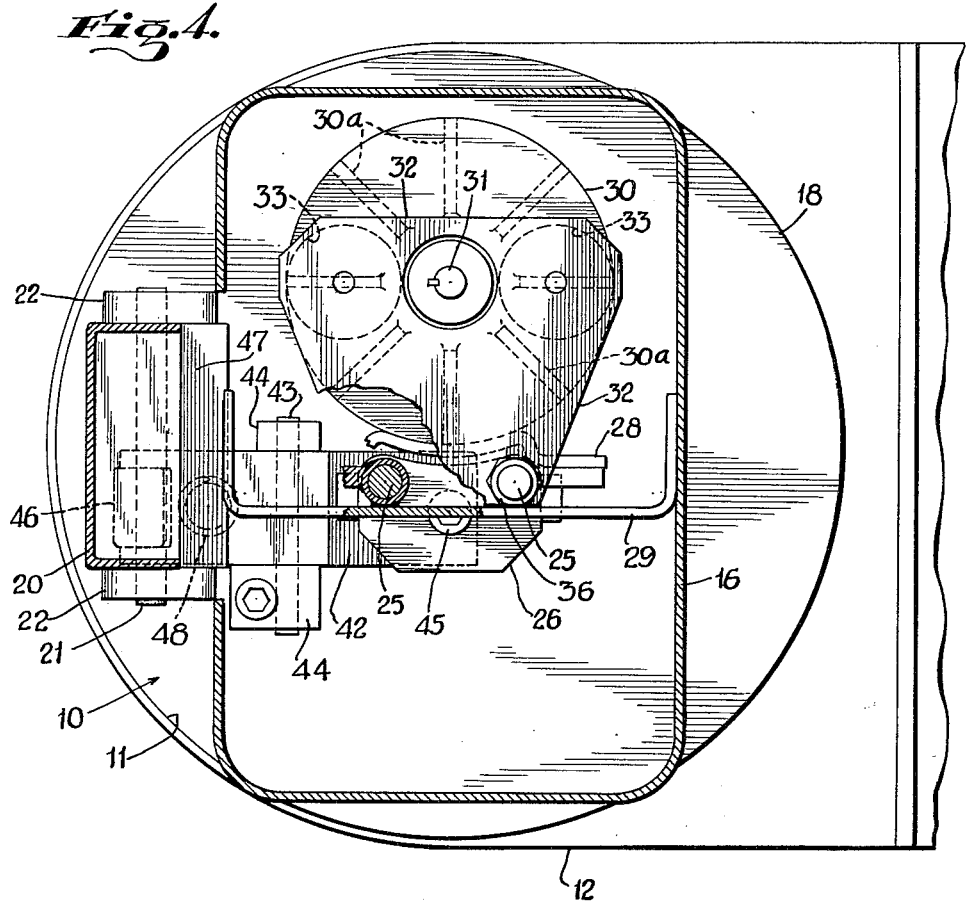

United States Patent Office 3,187,829
Patented June 8, 1965

3,187,829
BRAKE AND HANDLE CONTROL FOR
INDUSTRIAL TRUCK
Bronislaus I. Ulinski, Flossmoor, Ill., assignor, by mesne assignments, to Yale & Towne, Inc., New York, N.Y., a company of Ohio
Filed Jan. 29, 1963, Ser. No. 254,686
4 Claims. (Cl. 180—19)

This invention relates to industrial trucks of the class having a steering and traction unit that is controlled through a steering handle by the operator of the truck, and more particularly, to a novel brake and handle control for a truck of that class.

In the trucks of the particular class, the operator can use the handle to operate the truck while he walks, and the trucks sometimes are called pedestrian or "walkie" trucks. The steering handle can be moved laterally to rotate the steering and traction unit on a steering mounting, and is so mounted on the unit that it also can swing in a vertical direction. It is quite customary to utilize the vertical swinging of the handle to operate a brake for the traction motor of the steering and traction unit. Thus, when swung vertically to a particular position or positions, the handle will apply the brake so that the truck cannot move, while releasing the brake in other positions. I have conceived by my invention a brake and handle control mechanism that is exceedingly novel and ingenious and that will operate with extremely good effect on a truck of the particular class.

As a feature of my invention, I utilize a brake rod that is mounted to slide longitudinally in a position at one side of the traction motor of the steering and traction unit. The sliding rod controls a brake at one end of the traction motor, the brake rod being actuated by the steering handle.

In more detail, I mount the brake rod to slide in a tubular member parallel to the axis of the traction motor, while supporting a brake member in opposed relation to a brake disc that rotates with the motor shaft. By sliding in the tubular member, the brake rod will cause the brake member to move relatively to a braking position against the brake disc, while holding the member in axially aligned relation to the disc. A spring acts against the rod in a direction to press the brake member to braking position, the sliding of the rod being controlled by the steering handle. As a further detailed feature of my invention, the steering handle acts through a cam so arranged that the spring pressure of the brake rod will counterbalance at least a part of the weight of the steering handle.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings,

FIG. 3 shows a section on the broken line 3—3 in FIG. 2.

FIG. 4 shows a section on the line 4—4 in FIG. 2.

FIG. 5 is somewhat like FIG. 2, but shows a brake releasing position of my control.

Figure 1:
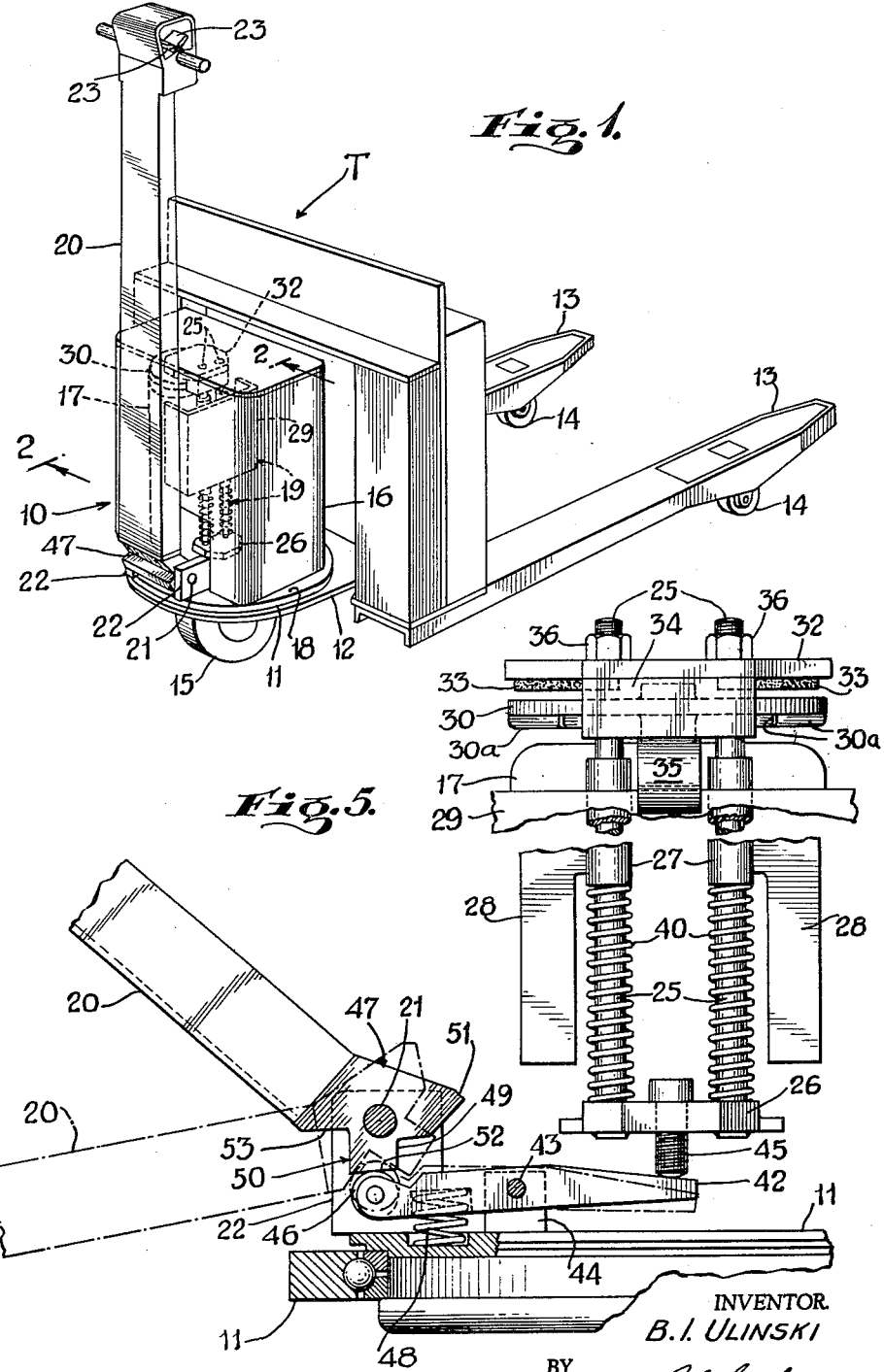
FIG. 1 shows an industrial truck utilizing my novel brake and handle control.

For the purpose of describing my invention, I show in FIG. 1 an industrial truck T having a steering and traction unit, indicated generally by the numeral 10, that is mounted through a bearing assembly 11 for steering rotation on a frame portion 12 of the truck. The truck T has a pair of load supporting legs 13 equipped with rear wheels 14, the front end of the truck moving on a steering and traction wheel 15 that forms a part of the unit 10. The steering and traction unit 10 has a traction motor 17 that is mounted in a vertical position on a base portion 18 of the unit, motor 17 being enclosed by a cover 16 and shown in dotted lines in FIG. 1. It will be understood that traction motor 17 will drive the traction wheel 15 through suitable gearing, not shown. The novel control mechanism of my invention, which I shall describe, also is enclosed by the cover 16 and is indicated by the numeral 19 in FIG. 1.

A steering handle 20, that may be conventional, is mounted for vertical swinging movement on a pivot 21 that is supported through a pair of brackets 22 on the base portion 18 of the unit 10. Thus, as will be understood, the operator of the truck can swing the steering handle 20 vertically, and also can move handle laterally to rotate the unit 10 on its steering mounting. I show the upper end of handle 20 equipped with manual controls 23 for the operation of the truck, but those controls are not important to an understanding of the invention that is the subject of the present application.

Figure 2:
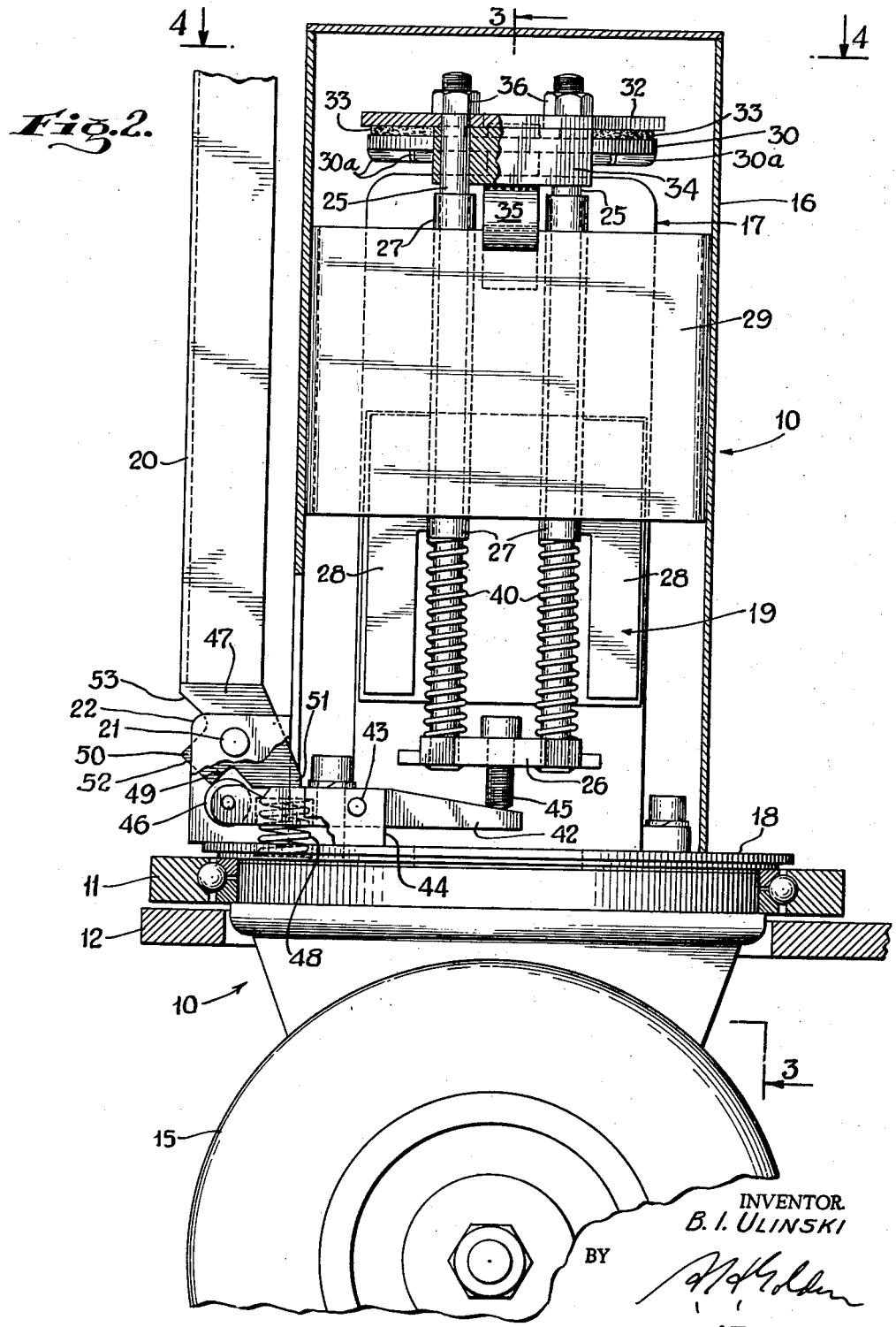
FIG. 2 is a section on the line 2—2 in FIG. 1, showing my control mechanism.

Referring now to FIGS. 2 to 5 of the drawings, my novel brake and handle control 19 includes one or more vertical brake rods 25 that are arranged in juxtaposed relation to one side of the traction motor 17, there being two of the rods 25 in the construction that I prefer. As best shown in FIG. 2, the brake rods 25 are connected at their lower ends through a cross member 26 so as to form an integral rod assembly, and a tubular bearing member 27 encircles each rod 25 to mount the assembly for longitudinal sliding movement. I support the tubular members 27 integrally on the traction motor 17, and for that purpose, I show member 27 welded to a bracket 28 on the side of the traction motor 17. I also show a cross plate 29 that is welded to the tubular bearing members 27 and that extends laterally to form a support for the cover 16.

At the upper end of the traction motor 17 there is a brake disc 30 which is keyed to the motor shaft 31, as best shown in FIG. 4, so as to rotate integrally with the shaft. I show the lower surface of disc 30 formed with ribs 30a that will circulate air for cooling the brake and motor. I support a brake member 32 on the brake rods 25 in position just above the rotating disc 30, opposed parts of the member 32 having a pair of circular brake lining portions 33 that are adapted to coact with the surface of disc 30. The brake member 32 has a relatively thick side portion 34, well shown in FIGS. 2 and 3, having openings for the brake rods 25 and adapted to slide on those rods. A curved spring 35 acts between the cross plate 29 and the side portion 34 of brake member 32 for holding member 32 against nuts 36 that are threaded on the upper ends of brake rods 25. Thus, it is possible for rods 25 to move relatively to the brake member 32, but that member normally will move with the rods as they slide in the tubular members 27.

In the construction I have just described, the brake rods 25 can slide in the tubular bearing members 27 to effect movement of brake member 32 to brake applying and releasing positions. The traction motor 17 will accept through the tubular members 27 the reaction that is due to the braking effect between brake member 32 and disc 30, and the tubular members 27 will at all times coact with rods 25 to hold the brake member 32 in axially aligned relation to brake disc 30. Should it be desired to adjust the position or alignment of the brake member 32, that can be done by rotating each nut 36.

Referring to FIG. 2, I assemble a coil spring 40 in position about each brake rod 25 to act between a tubular member 27 and the lower cross member 26 on the rods. The springs 40 press the brake rods 25 in a downward direction, thus pressing the brake member 32 toward braking position against the brake disc 30.

The brake rods 25 will be controlled through a lever 42, FIGS. 2 to 5. The lever 42 is mounted through a pivot 43 that is supported by a pair of blocks 44 on the base portion 18 of the steering and traction unit 10. As best seen in FIGS. 2 and 5, one end of lever 42 coacts with an adjusting screw 45 on the cross member 26 of rods 25, while the other end of lever 42 is equipped with a roller 46 that is in opposed relation to a cam 47 on the lower end of the steering handle 20. A coil spring 48 acts against the lever 42 in a direction to press its roller 46 toward the cam 47.

Referring again to FIG. 2, the steering handle cam 47 has a dwell 49 so formed as to accept the roller 46 when steering handle 20 is vertical. Cam 47 also has a forward portion 50 which then is against one side of the roller 46, and a rearward portion 51 against the upper surface of lever 42. It will be seen also that the forward cam portion 50 has a surface 52 which is inclined in an outward direction relatively to the pivot 21 of the steering handle 20.

The brake springs 40 apply very considerable pressure through the lever 42, so that in the position of FIG. 2, the roller 46 acts against the cam portion 50 to hold the steering handle 20 vertical. The lever 42 now is acting against the rearward cam portion 51, in effect forming a yielding stop for rearward swinging of handle 20. With the handle 20 vertical and lever 42 in the position shown in FIG. 2, the brake springs 40 hold the rods 25 in a downward braking position, the brake member 32 being pressed against the brake disc 30.

Let us now assume that the operator wishes to operate the truck, and swings the steering handle 20 downwardly to a convenient steering position as indicated in full lines in FIG. 5. That causes cam 47 to rotate the lever 42 so as to slide rods 25 upwardly to a brake releasing position, FIG. 5, allowing traction motor 17 to be operated. Further, it will be observed that cam roller 46 now rides upon the inclined cam surface 52. By so doing, the roller 46 enables the pressure of brake springs 40 to oppose the downward swinging of steering handle 20, the arrangement being such that the pressure substantially counterbalances the weight of the handle 20.

I show the cam 47 formed with a further dwell 53 which is in position to accept roller 46 when steering handle 20 is substantially horizontal, as shown in dot and dash lines in FIG. 5. Thus, whether handle 20 is allowed to drop to a horizontal position or swung upwardly to vertical position, as shown in FIG. 2, cam 47 will be actuated so that the brake springs 40 will slide the rods 25 to brake applying position.

I believe that the construction and operation of my brake and handle control will now be understood. Through the novel and ingenious features of my control, I am able to equip the steering and traction unit of an industrial truck with a disc brake that is relatively simple but that will operate exceedingly well, while controlled by the steering handle of the unit in the manner that is desired. In addition, it is possible through my invention to make the brake springs fully effective for counterbalancing the steering handle. I believe, therefore that those persons skilled in the art will understand the very considerable value of the novel brake and handle control that I contribute by my invention, and that the merits of my invention will be fully appreciated.

I now claim:

1. In a truck of the class described, a steering and traction unit mounted for steering rotation and having a traction motor, a steering handle pivoted for vertical swinging movement on said unit and adapted to rotate said unit for steering the truck, a brake disc rotating with the shaft of the traction motor, brake rod means juxtaposed to the traction motor, a brake member for said disc supported by one end of said brake rod means, guide means connected to said motor and encircling said brake rod means to mount said brake rod means and its brake member for sliding movement while holding said brake member in axially aligned relation to the brake disc, and means actuated by the swinging movement of said steering handle for sliding said brake rod to effect movement of the brake member into and out of frictional relation to the disc.

2. In a truck of the class described, a steering and traction unit mounted for steering rotation and having a traction motor mounted in a vertical position on said unit, a steering handle pivoted for swinging movement relatively to a vertical position on said unit and adapted to rotate said unit for steering the truck, a brake disc rotating with the shaft of the traction motor at the top of said motor, brake rod means arranged verically at one side of the motor, a brake member supported by one end of said brake rod means for coacting with the brake disc, guide means connected to said motor and encircling said brake rod means to mount said brake rod means and its brake member for sliding movement while holding said brake member in vertically aligned relation to the brake disc, spring means pressing said brake rod means in a direction on its mounting to move the brake member to a brake applying position against the brake disc, a lever pivotally mounted about its center and coacting with a lower end portion of said brake rod means at one end thereof, a cam in contact with the opposite end of said lever through which the steering handle moves said lever to slide the rod in a brake releasing direction when said handle is swung downwardly, and a portion of said cam against which said opposite end of said lever acts due to the pressure of the spring means on said brake rod means to counterbalance at least a part of the weight of the vertically swinging steering handle.

3. In a truck of the class described, a steering and traction unit mounted for steering rotation and having a traction motor, a steering handle pivoted for vertical swinging movement on said unit and adapted to rotate said unit for steering the truck, a brake for said motor, brake rod means extending downwardly from said brake, a lever extending between said brake rod means and said steering handle, said lever pivotable about its center, a cam on the steering handle, a portion of said cam acting against one end of said lever and rotating said lever to effect a releasing movement of the brake when said handle is swung downwardly from a vertical position, spring means resisting the brake releasing movement of said lever and therefore the downward swinging of said steering handle, the pressure of said lever due to said spring means acting through said cam portion to press the steering handle toward vertical position, and a further portion of said cam moving against a surface on a medial part of the lever when the steering handle swings to vertical position so that the lever by its pressure due to the spring means will act as a yielding stop for rearward movement of the handle.

4. In a truck of the class described, a steering and traction unit mounted for steering rotation and having a traction motor, a steering handle pivoted for vertical swinging movement on said unit and adapted to rotate said unit for steering the truck, a brake for said motor, brake rod means extending downwardly from said brake, a lever extending between said brake rod means and said steering handle, said lever pivotable about its center, a cam on the steering handle, a portion of said cam arranged at one side of the steering handle pivot and acting against one end of said lever to move said lever in a brake releasing direction when said handle is swung downwardly from a vertical position, spring means resisting the brake releasing movement of said lever and therefore the downward swinging of said steering handle, the pressure of said lever due to said spring means acting through said cam portion to press the steering handle toward vertical position, a further portion of said cam arranged at the other side of the steering handle pivot relatively to the first cam portion and in opposed relation to a surface on a medial part of the lever, and said further cam portion and lever surface being formed to engage each other when the steering handle swings to vertical position, so that the lever by its pressure due to the spring means will act as a yielding stop for rearward movement of the handle.

References Cited by the Examiner

UNITED STATES PATENTS

| | | | |
|---|---|---|---|
| 2,327,583 | 8/43 | Framhein | 180—19 X |
| 2,651,379 | 9/53 | Ellicott et al. | 180—12 |
| 2,840,175 | 6/58 | Ulinski | 180—19 X |
| 2,913,062 | 11/59 | Ulinski | 180—19 |
| 2,918,134 | 12/59 | Jensen | 180—19 X |
| 3,057,426 | 10/62 | Hastings | 180—65 X |

FOREIGN PATENTS 1,038,486  9/58  Germany.

A. HARRY LEVY, *Primary Examiner.*

PHILIP ARNOLD, *Examiner.*